United States Patent
Kobo et al.

Patent Number: 5,099,328
Date of Patent: Mar. 24, 1992

[54] GHOST CANCELLER

[75] Inventors: Kazuo Kobo, Sakai; Yutaka Miki, Hirakata; Kiyotake Fukui, Settsu; Hiroyasu Shinbo, Toyonaka; Mikio Sasaki, Ibaraki; Takashi Yamaguchi, Ibaraki; Takaaki Gyoten, Ibaraki; Hidefumi Horiuchi, Osaka, all of Japan

[73] Assignee: Matsushita Electric Industrial Co., Ltd., Osaka, Japan

[21] Appl. No.: 621,434

[22] Filed: Dec. 4, 1990

[30] Foreign Application Priority Data

Dec. 12, 1989 [JP] Japan ............... 1-322122
Dec. 12, 1989 [JP] Japan ............... 1-322123
Dec. 12, 1989 [JP] Japan ............... 1-322124

[51] Int. Cl.$^5$ ............... H04N 5/213; H04N 5/205
[52] U.S. Cl. ............... 358/167; 358/905; 358/36
[58] Field of Search ............... 358/166, 167, 905, 36, 358/37

[56] References Cited

U.S. PATENT DOCUMENTS

| | | | |
|---|---|---|---|
| 4,303,895 | 12/1981 | Ohnishi | 358/905 |
| 4,502,077 | 2/1985 | Morotomi | 358/167 |
| 4,575,857 | 3/1986 | Murakami | 358/905 |

OTHER PUBLICATIONS

Ghost Canceller with GCR Signal, ITEJ Techincal Report ROFT 89-6, pp. 31-36, Jun. 1989.
Development of Ghost Reduction Tuner, ITEJ Technical Report vol. 13, No. 53, pp. 1-6, Oct. 1989, NEC HomeElectronics, Ltd. Reiichi Kobayashi et al.
Ghost Clean System, ITEJ Technical Report, vol. 13, No. 53, pp. 7-12, Oct. 1989, Iga Hiroyuki et al., Toshiba Corporation, Toshiba Audio Video Engineering Corp. ITEJ (The Institute of Television Engineers of Japan) Technical Report RE80-6, pp. 9-14, Feb. 1980.

Primary Examiner—Victor R. Kostak
Assistant Examiner—Sherrie Hsia
Attorney, Agent, or Firm—Wenderoth, Lind & Ponack

[57] ABSTRACT

A ghost canceller includes a ghost cancelling circuit, waveform memories, a CPU, a training signal generating circuit, and a ghost variation detection circuit. By taking in GCR signals from the waveform memories into the CPU, synchronous addition and field sequence processing are effected, and they are transferred to the training signal generating circuit. The input video signal is changed over to the training signal to cancel ghosts, and when ghost variations are is not detected by the ghost variation detection circuit, the input video signal is fed into the ghost cancelling circuit, and is delivered as an output video signal.

8 Claims, 10 Drawing Sheets

GHOST CANCELLER

BACKGROUND OF THE INVENTION

1. Field of the Invention

The present invention relates to a ghost canceller for removing ghosts by using a GCR signal or a vertical synchronizing signal.

2. Description of the Prior Art

Recently there is an increasing demand for a larger screen and higher picture quality of television systems. To meet this need, the attention has been directed again to the ghost interference that has been hitherto known as the greatest factor of deteriorating the receiving picture quality of television systems. In the existing ghost cancelling technology, the leading edge of the vertical synchronizing signal of the television signal is used as the reference signal. On the other hand, from August 1989, EDTV (extended definition television) broadcasting was started. As a result it has been made possible to remove ghosts efficiently by making use of a special signal (ghosts cancelling reference signal) superposed in the vertical blanking period of the television signal for detecting the ghosts.

As a prior example, a ghost canceller was reported in the ITEJ Technical Report RE80-6, pp.9 to 14 (February 1980) (ITEJ: the Institute of Television Engineers of Japan). This is intended to cancel ghosts by using the vertical synchronizing signal of television signal as a reference signal. This ghost canceller comprises a serially connected FIR (finite impulse response) filter and an FIR/IIR (infinite impulse response) filter, a tap gain control circuit for obtaining the tap gain of these transversal filters, and a tap gain hold circuit for holding the tap coefficients. The FIR filter equalizes the waveform near the peak of the impulse response, using the impulse signal obtained by differentiating the leading edge of the vertical synchronizing signal as the reference signal. The FIR/IIR filter is changed over to the FIR mode to correct the tap coefficients by calculating the correlation of the input and output of the transversal filter, thereby cancelling the ghosts. Afterwards, without changing the tap coefficients, the FIR/IIR filter is changed over to the IIR mode.

An example of a ghost canceller using a GCR (a ghost cancel reference) signal was reported in the ITEJ Technical Report ROFT 89-6, pp.31 to 36 (June 1989). This ghost canceller comprises a transversal filter, a waveform memory for taking in the input and output of the transversal filter, and a CPU (central processing unit) for controlling them. The GC signal superposed in the vertical blanking interval of television signal is taken out and put into the CPU through the waveform memory. The CPU adds the GCR signals for improving the S/N (signal/noise) ratio in a sufficient number of fields (synchronous addition). Since the GCR signals are sent out in a sequence of a cycle of 8 fields (field sequence), the CPU also executes interfield processing (field sequence processing) on the basis of the field sequence. After synchronous addition and field sequence processing, the tap coefficients of the transversal filter are corrected on the basis of such algorithms as a MSE (mean square error) method and a ZF (zero forcing) method.

In these ghost cancellers, the arithmetic operation for tap coefficient correction of the transversal filter is effected in the time domain. The calculation for determining the optimum tap coefficients is repeated to correct sequentially. Accordingly, as the number of synchronous additions is increased, the operation time becomes longer, and it takes a longer time to cancel ghosts. Besides, since the GCR signal is taken in on every correction of tap coefficients, it is likely to be effected by disturbances such as flutter and impulse noise, and it is highly possible that ghost cancelling action will be unstable.

SUMMARY OF THE INVENTION

It is hence a primary object of the invention to present a ghost canceller capable of reducing the residual ghost level in a minimum ghost cancelling time, in a simple hardware composition, while enhancing the stability of the ghost cancelling operation.

To achieve the above object, a ghost canceller of present invention has a training signal generating circuit for holding as a training signal a GCR signal processed by synchronous addition and field sequence processing in a CPU (Central Processing Unit) or a vertical synchronizing signal processed by synchronous addition. Using this training signal instead of the input video signal of the ghost canceller, the ghost is cancelled. Preferably, the ghost state of the input video signal is monitored by a ghost variation detection circuit.

The training signal read out from the training signal generating circuit has already finished the synchronous addition or both the synchronous addition and field sequence processing, and therefore does not require these operations in the CPU subsequently. Accordingly, the processing speed is increased, and hence the ghost cancelling time is notably shortened. Besides, during ghost cancelling process, since the input video signal is not used, the operation is stable, being completely free from effects of interference. Further, when a ghost variation is detected, misjudgement does not occur when feeding the input video signal into the ghost cancelling circuit.

DESCRIPTION OF THE PREFERRED EMBODIMENTS

Figure 1:
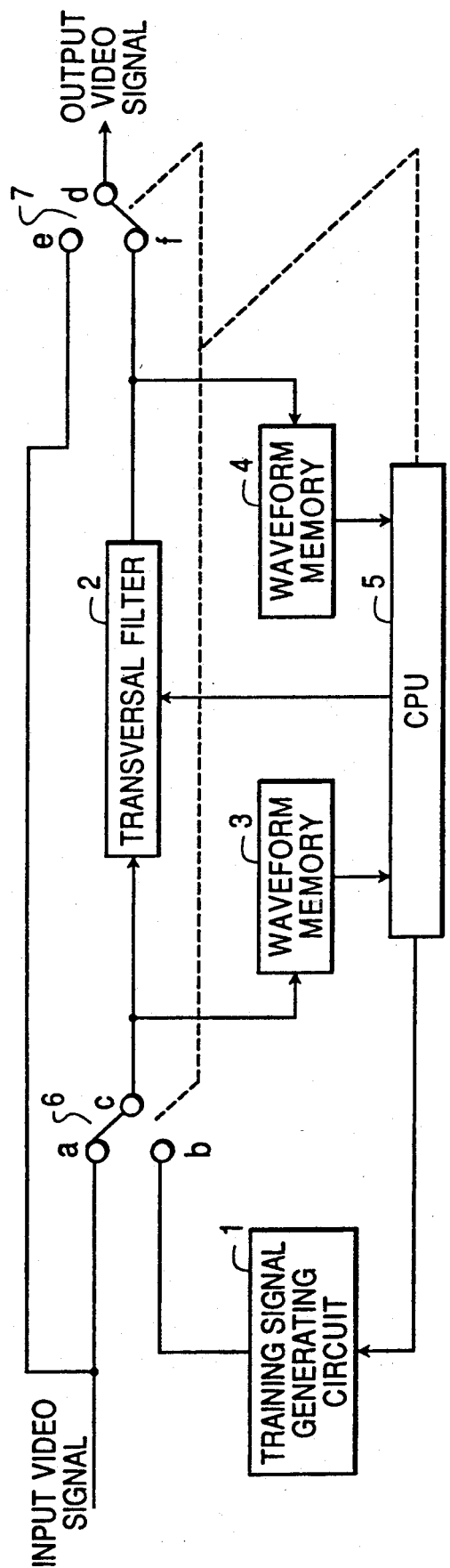
FIG. 1 is a fundamental circuit composition block diagram of a ghost canceller of the invention.

FIG. 1 is a fundamental circuit block diagram of a ghost canceller of the invention. To begin with, the terms used in the following description are defined. The "reference signal" is a specific signal used in ghost detection, such as GCR signal and vertical synchronizing signal, and the ghost is detected by subtracting this reference signal from the input video signal affected by ghost. The "synchronous addition" is to add the vertical synchronizing signal or GCR signal in the same timing in the adjacent fields. The "field sequence" is a combination of a cycle of 8 fields, being composed of WRB signals and 0 pedestal signals, as explained below. The "field sequence processing" is to calculate the signals of the field sequence in equation (1) mentioned below. The "training signal" is a signal after field sequence processing in the ghost cancelling using the GCR signal, or a signal after synchronous addition in the ghost cancelling using the vertical synchronizing signal. The "training processing" is the ghost cancelling process using the training signal. Referring to FIG. 1, element 1 is a training signal generating circuit element 2 is a transversal filter element 3 and 4 are waveform memories, element 5 is a CPU (central processing unit), and element 6 and 7 are switches. Before ghost cancellation, the switch 6 is connected in the a-c position, and the switch 7 is connected in the e-d position. In this state, the input video signal is fed into the transversal filter 2, and is delivered as an output video signal. The GCR signal superposed in 18H (H: horizontal line) or 281H of the input and the output video signals of the transversal filter 2 is written into the memories 3 and 4 by DMA (direct memory access). The CPU 5 reads out the signals stored in the waveform memories 3 and 4, and takes them into an internal RAM (random access memory). In the EDTV broadcast, the GCR signal is sent out by superposing the WRB (wide reverse bar) signal and 0 pedestal signal shown in FIGS. 3(a) and 3(b) in the same horizontal period in the sequence circulating in 8 fields consisting of a WRB signal, a 0 pedestal signal, a WRB signal a 0 pedestal signal, 0 pedestal signal, WRB signal, 0 pedestal signal, and WRB signal. These signals in the 8 fields are calculated according to equation (1), and the signal as shown in FIG. 3 (c) is obtained.

$$F = 1/4\{(F1-F5)+(F6-F2)+(F3-F7)+(F8-F4)\} \quad (1)$$

where Fn (n=1 to 8) denotes the n-th field signal.

Figure 3:
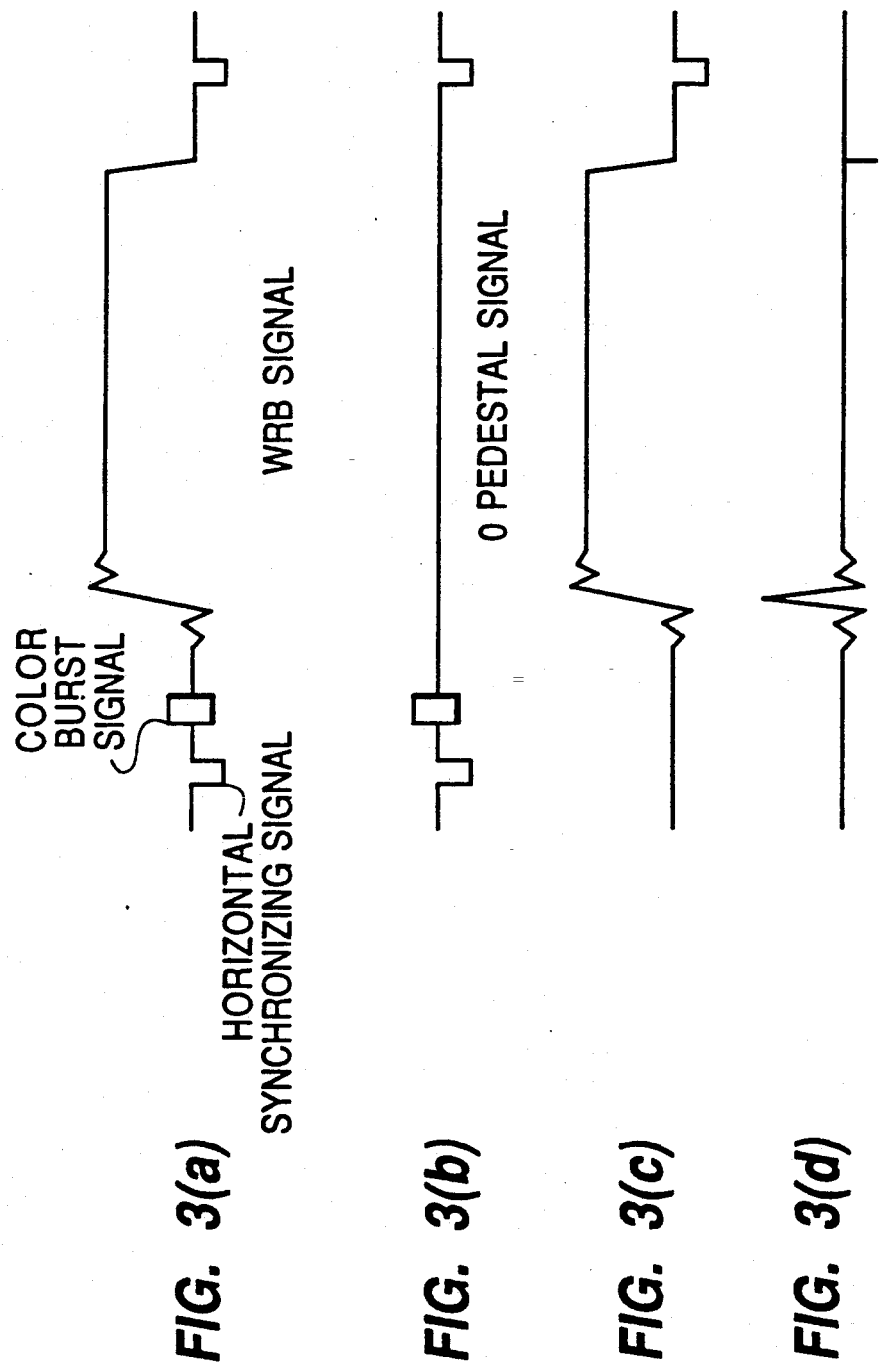
FIG. 3(a) is a waveform diagram of WRB signal.
FIG. 3(b) is a waveform diagram of 0 pedestal signal, (c) is a waveform diagram of waveforms of the FIG. 3(a) and FIG. 3(b) after interfield processing.
FIG. 3(d) is a waveform diagram of the differentiated signal of FIG. 3(c).
Figure 4:
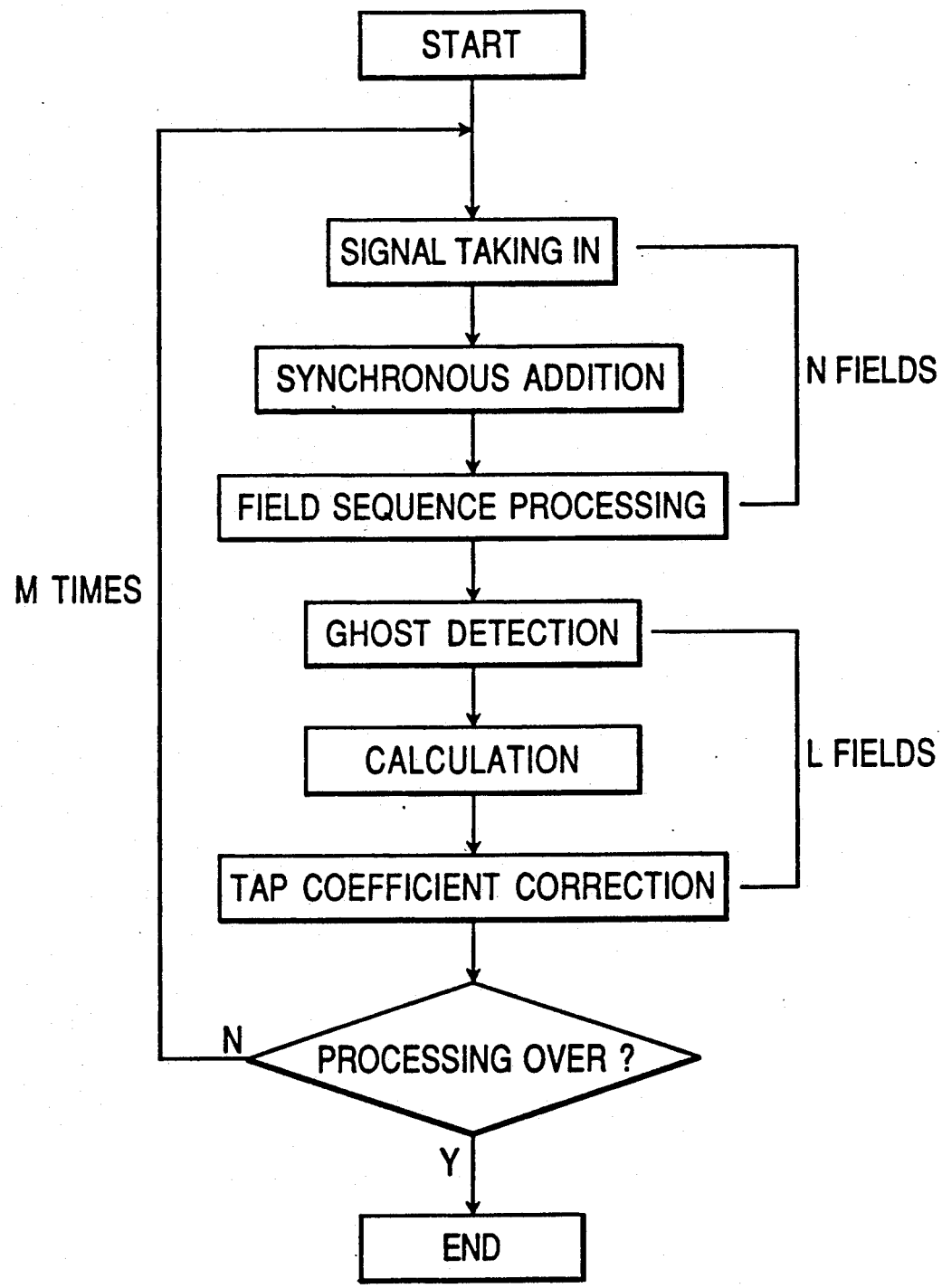
FIG. 4 is a processing flow chart of a conventional ghost canceller.

Actually, using the differentiated signal shown in FIG. 3 (d) of the signal in FIG. 3 (c), the ghost is detected. An error signal is determined by differential calculation between the signal calculated in equation (1) from the signal taken into the CPU 5 and the signal in the absence of ghosts shown in FIG. 3 (d). The detection level of this error signal is the residual ghost level. When the S/N ratio of the input video signal is low, by the synchronous addition of 8 fields shown in equation (1) alone, the residual ghost level becomes lower than the noise signal level until the residual ghost level is sufficiently lowered, so that the ghost and noise cannot be distinguished. In this state, it is no longer possible to detect the error signal, and as a result the residual ghost level becomes the ghost cancelling limit. Therefore, in order to further reduce the residual ghost, the S/N ratio must be increased by sufficient synchronous addition due to the reason mentioned above. Accordingly, a sufficient number of fields should be taken in, for example, 128 fields or 256 fields. The signal corresponding to FIG. 3 (d) sufficiently improved in S/N is transferred as the training signal from the CPU 5 to the training signal generating circuit 1. At this moment, the switch 6 is changed over to connect in the b-c position. The training signal generating circuit 1 repeatedly delivers the training signal transferred from the CPU 5. Thereafter until the CPU 5 judges that the ghost residual level is sufficiently small, the output of the training signal generating circuit 1 is taken into the CPU 5 through waveform memories 3 and 4 connected to the input and the output of the transversal filter 2 to cancel ghosts. Since the training signal has already finished synchronous addition and field sequence processing, these processes are not needed thereafter. This mode is explained in FIGS. 4 and 5. FIG. 4 is a processing flow chart of a conventional ghost canceller. Assume that the synchronous addition requires N fields, the field sequence processing 1 field, the ghost detection, calculation and tap coefficient correction L fields, and the number of corrections is M times. From FIG. 4, the time required for entire processing is expressed in equation (2).

$$T \text{ old} = (N+L) \times M/60 \text{ (sec)} \quad (2)$$

Figure 5:
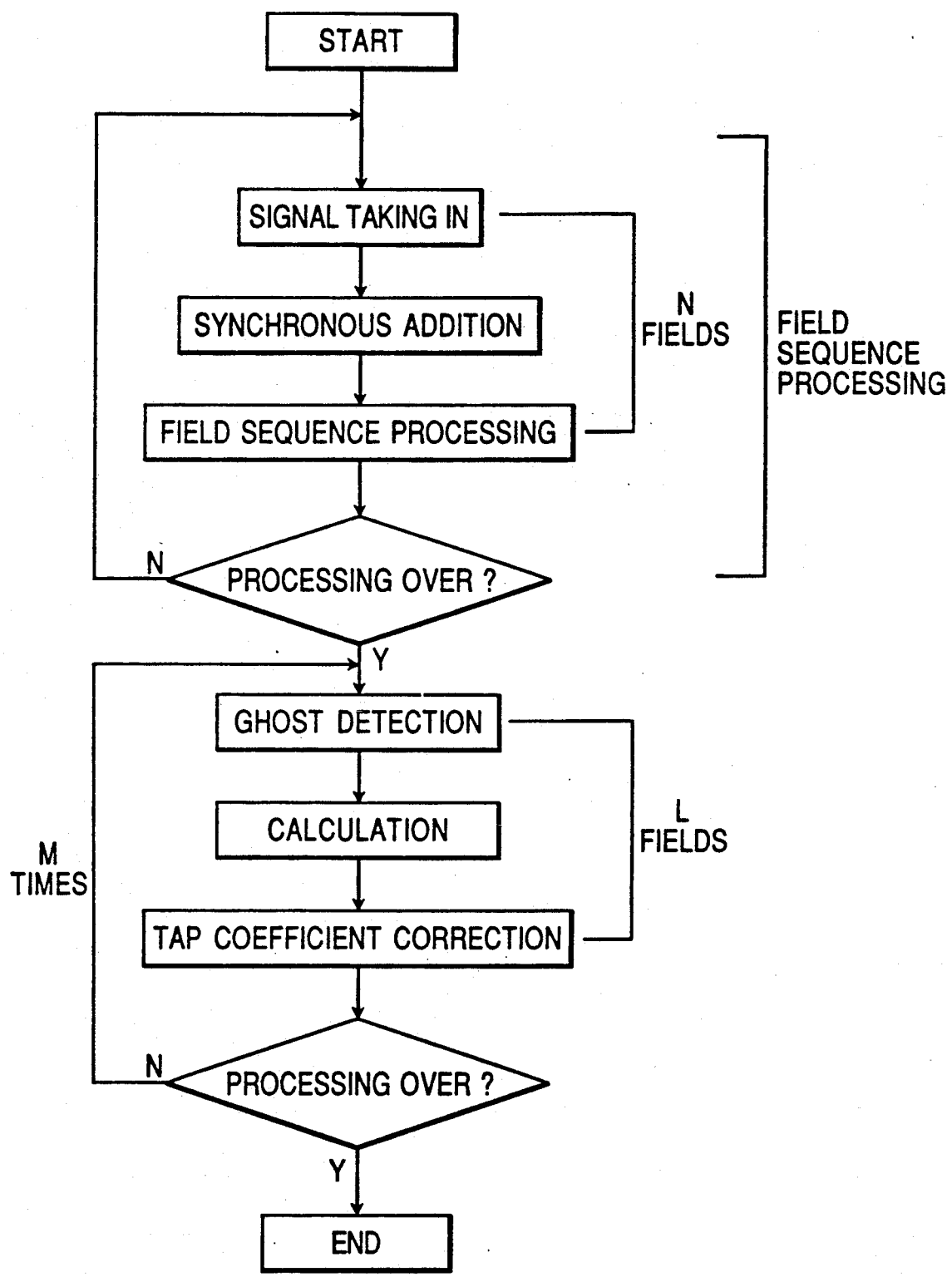
FIG. 5 is a processing flow chart of a ghost canceller of the invention.

FIG. 5 shows the processing flow chart of the ghost canceller of the invention. The first half of processing is for creating the training signal, and the second half is the ghost cancelling processing. The processing time is similarly calculated as follows.

$$F \text{ NEW} = (N+M\times L)/60 \text{ (sec)} \quad (3)$$

The ratio of the processing times of the two is expressed as $\alpha$ $$\alpha = (N+M\times L)/\{(N+L)\times M\} \quad (4)$$

supposing, as general values, the synchronous addition to be 128 fields, the number of corrections 20 times, and the ghost detection + calculation + tap coefficient correction to be 1 field, the ratio $\alpha$ is 1/17, which proves a notable time reduction.

As the means for correcting the tap coefficients, the MSE (mean square error) method or ZF (zero forcing) method is known. In these methods, according to a specific algorithm, calculations are effected in the time domain, and the tap coefficients are corrected sequentially to finally obtain the optimum tap coefficients. Supposing the output signal of the transversal filter to be $\{Yk\}$, the reference signal to be $\{Rk\}$, the differential signal of the output signal of the transversal filter and the reference signal to be $\{Ek\}$, and the total number of taps to be $M+N+1$, the n-th tap coefficient $C\{i\}^{(n)}$ of the transversal filter is corrected according to equation (5) in the MSE method, and equation (6) in the ZF method, in which $\alpha$ and $\beta$ are coefficients for determining the correction amount.

$$\{Ci\}^{(n-1)} = \{Ci\}^{(n)} - \alpha \cdot \sum_{k=-M}^{N} Yk - iEk \quad (5)$$

$$\{Ci\}^{(n-1)} = \{Ci\}^{(n)} - \beta \cdot Ei \quad (6)$$

When the ghost cancelling by the training signal is finished, the switch 6 is connected in the a-c position, and the switch 7 is connected in the f-d position, so that the input video signal is delivered as an output video signal having ghosts cancelled through the transversal filter 2.

Figure 2:
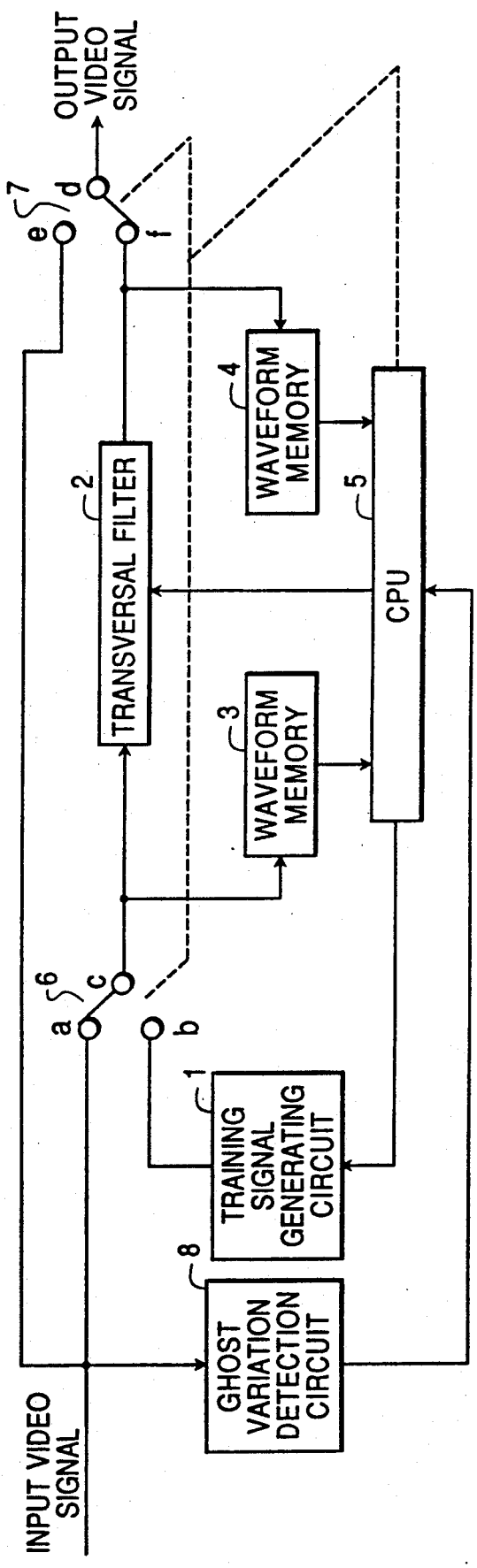
FIG. 2 is another fundamental circuit composition block diagram of a ghost canceller of the invention.

FIG. 2 is a fundamental circuit composition block diagram of the ghost canceller improved in the stability of ghost cancellation. Element 1 is a training signal generating circuit element 2 is a transversal filter elements 3 and 4 are waveform memories, element 5 is a CPU (central processing unit); elements 6 and 7 are switches, and element 8 is a ghost variation detection circuit. The input video signal of the ghost canceller is fed into the transversal filter 2 through the a-c route of the switch 6, and into the ghost variation detection circuit 8. On the other hand, the switch 7 is connected in the d-e position. The CPU 5 takes in the input and output of the transversal filter 2 through waveform memories, 3 and 4, and processes the field sequence. The CPU 5 transfers the training signal to the training signal generating circuit 1. Changing over the switch 6 to the position b-c, the training signal generating circuit 1 delivers the training signal to the transversal filter 2. The CPU 5 consequently takes in the training signal through the waveform memories 3 and 4 to cancel ghosts, and controls the transversal filter 2. After cancelling ghosts, the switch 6 is connected in the a-c position, and the switch 7 is connected in the d-f position, thereby delivering the video signal free from ghosts. Generally, however, it is known that the ghosts vary with the temperature, humidity and other climate conditions. Since flutter and impulse noise are temporary fluctuations, the original state is restored when such interference is eliminated. But, in stationary changes as mentioned above, the ghost state varies. During the training process, the switch 6 is cutting off the input video signal. Therefore, there is no means to check if the ghost is varying or not. If the ghost is varied, when the transversal filter 2 is controlled by the result of cancelling the ghost in the training process, the signal may be more distorted than before the ghost cancelling if the input video signal is fed in the ghost cancelling circuit by changing over the switch 6. Accordingly, even during the training process, the ghost variations are always detected by the ghost variation detection circuit 8. The practical method and structure for detection are explained later. Anyway, when the ghost variation is detected, the CPU 5 is reset, and the ghost cancelling process is restarted from the beginning. If the ghost variation is not detected, the switch 6 is changed over to a-c position, and the input video signal is fed into the transversal filter 2. As a result, decision of changeover at the end of ghost cancelling by the training processing will not be mistaken.

Figure 6:
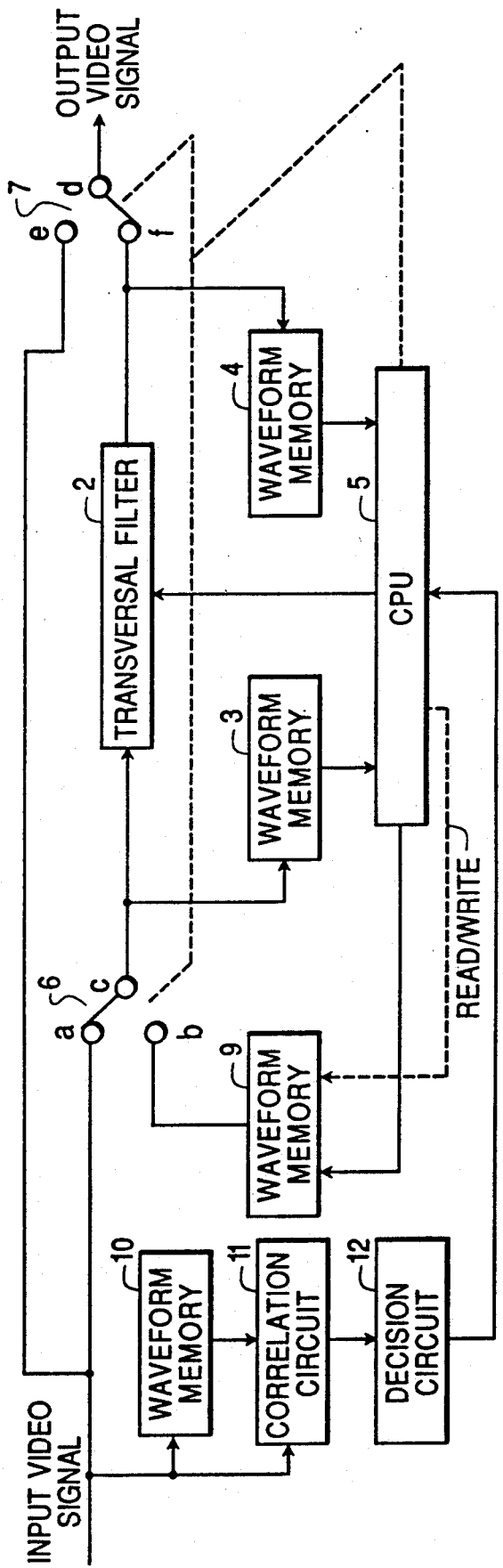
FIG. 6 is a practical circuit composition block diagram of a ghost canceller of the invention.

FIG. 6 is a more specific circuit composition block diagram of a ghost canceller. Element 2 is a transversal filter, elements 3 and 4 are waveform memories; element 5 is a CPU (central processing unit); element 6 and 7 are switches; elements 9 and 10 are waveform memories; element 11 is a correlation circuit, and element 12 is a decision circuit. Before ghost cancellation, the switch 6 is connected in the a-c position, and the switch 7 is connected in the end position. The input video signal is fed to the transversal filter 2 through the switch 6. The input and output of the transversal filter 2 are fed to the CPU 5 through the waveform memories 3 and 4. After the training process in the CPU 5, the training signal is written into the waveform memory 9. Changing the switch 6 to the b-c position, the training signal is read out from the waveform memory 9, and is fed into the transversal filter 2. The input and output of the transversal filter 2 are taken into the CPU 5 through the waveform memories 3 and 4, and the ghost is cancelled. The correlation circuit 11 for controlling the transversal filter 2 calculates the correlation between the GCR signal of the present field and the GCR signal of the previous field held in the waveform memory 10. The result of this correlation calculation is compared with a threshold level in the decision circuit 12. If the result of correlation is low and below the threshold level, it is judged that the ghost has been changed. On the contrary, if the result of correlation was high and above the threshold level, it is judged that the ghost has not been changed. This result is transferred to the CPU 5. After ghost cancellation, the switch 6 is changed over to the a-c position and the switch 7 is changed to the d-f position, and the video signal without ghosts is delivered.

Figure 7:
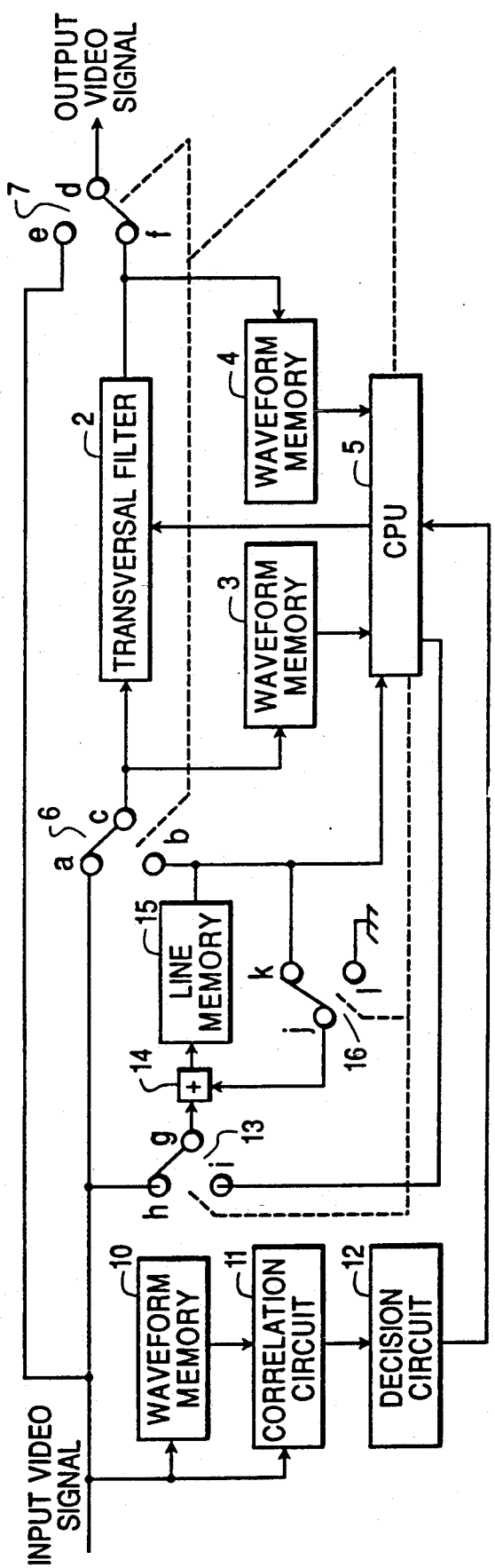
FIG. 7 to FIG. 10 are other practical circuit composition block diagrams of ghost cancellers of the invention.

FIG. 7 is a further specific circuit composition block diagram of a different ghost canceller. In this circuit composition, the processing of . the training signal generating circuit 1 also involves the function of the synchronous addition. Element 2 is a transversal filter; element 3 and 4 are waveform memories, element 5 is a CPU (central processing unit); element 6 and 7 are switches element, 10 is a waveform memory; element 11 is a correlation circuit; element 12 is a decision circuit; element 13 and 16 are switches; element 14 is an adder, and element 15 is a line memory. Prior to ghost cancellation, the switch 6 is connected in the a-c position; the switch 7 is connected in the d-e position, the switch 13 is connected in the g-h position, and the switch 16 is connected in the j-k position. The input video signal is fed into the adder 14 through the transversal filter 2 and switch 13. The adder 14 adds the signal from the switch 13 and the signal one field before delivered from the line memory 15. The signal after sufficient synchronous addition is taken into the CPU 5. After the field sequence processing in the CPU 5, the switch 13 is changed over to the g-k position, and the switch 16 to is changed to the j-i position, so that the training signal is written into the line memory 15. The switch 6 is changed over to the b-c position, so that the training signal is read out from the line memory 15, and is delivered to the transversal filter 2. The input and output of the transversal filter 2 are taken into the CPU 5 through the waveform memories, 3 and 4, and the ghost is cancelled by controlling the transversal filter 2. After ghost cancellation, the switch 6 is changed over to the a-c position, the switch 7 changed to the d-f position; so that the ghost-free video signal is delivered.

Figure 8:
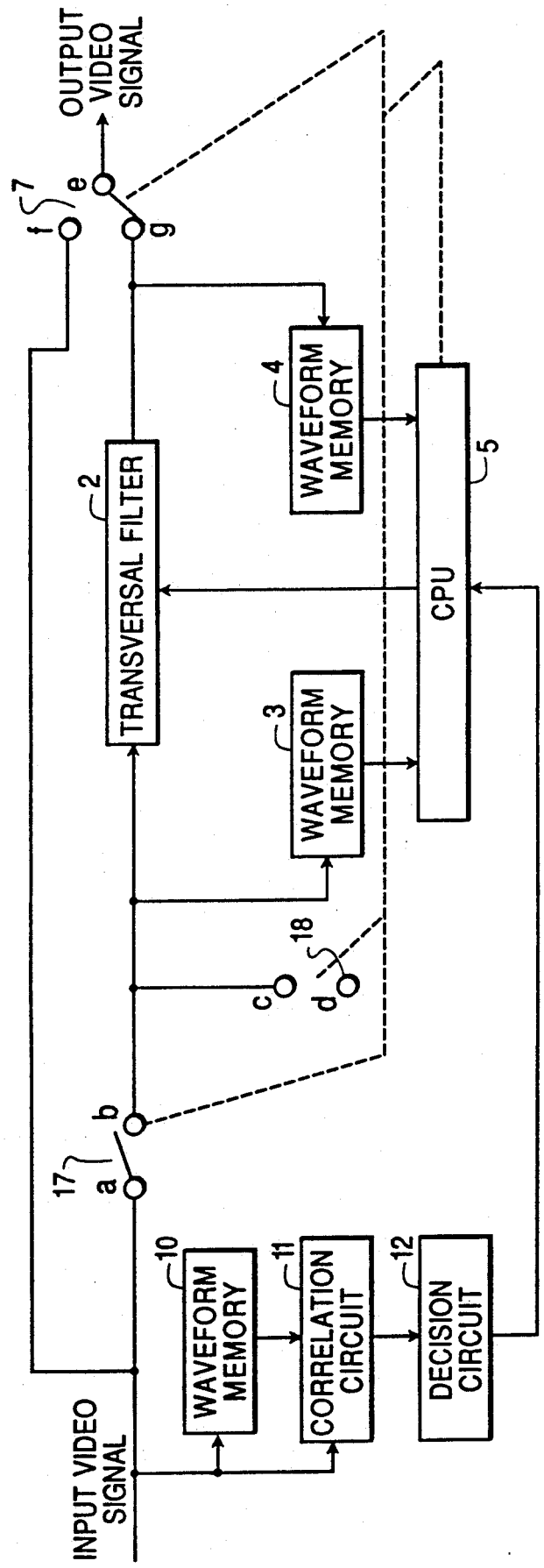

FIG. 8 is a circuit composition block diagram of a further different ghost canceller. In this circuit composition, the training signal generating circuit 2 is not used. The input side one of the waveform memories for taking in the input and output of the transversal filter is used equivalently to the training signal generating circuit. Element 2 is a transversal filter, element 3 and 4 are waveform memories; element 5 is a CPU (central processing unit); elements 7, 17 and 18 are switches; element 10 is a waveform memory, element 11 is a correlation circuit, and element 12 is a decision circuit. Before ghost cancellation, the switch 17 is connected in the a-b position, the switch 18 is connected in the c-d position and the switch 7 is connected in the e-f position. The input video signal is fed into the transversal filter 2. The input and output of the transversal filter 2 are taken into the CPU 5 through the waveform memories 3 and 4 to be subjected to the synchronous addition and the field sequence processing The CPU 5 writes the training signal into the waveform memory 3. Cutting off the connection a-b of the switch 17, the waveform memory 3 is repeatedly read out and is fed into the transversal filter 2. The output of the transversal filter 2 is taken into the CPU 5 through the waveform memory 4, and the ghost is cancelled by controlling the transversal filter 2. After ghost cancellation, the switch 17 is changed over to the a-b position and the switch 7 is changed to the e-g position so that the ghost-free video signal is delivered.

Figure 9:
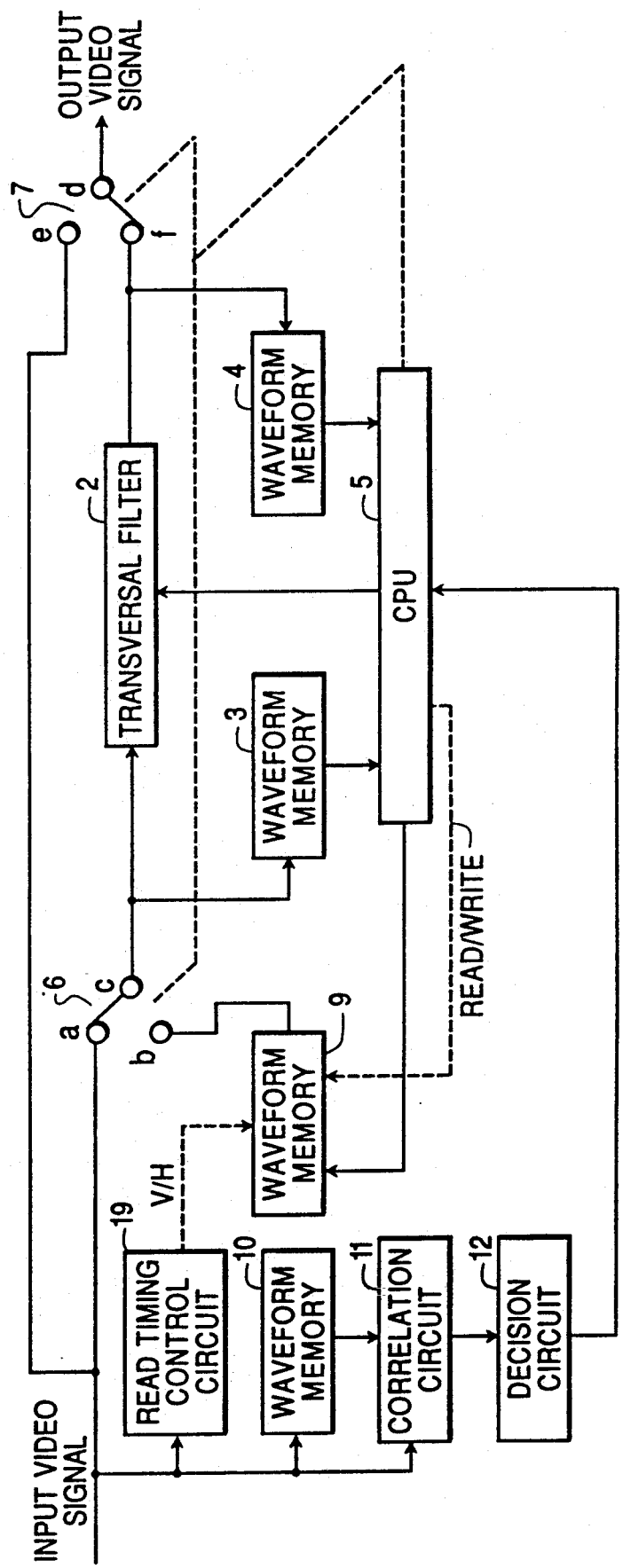

FIG. 9 is a specific circuit composition block diagram of still another ghost canceller. This is intended to improve the ghost cancelling time by controlling the interval of readout timings of the training signal. Element 2 is a transversal filter, elements 3 and 4 are waveform memories; element 5 is a CPU (central processing unit), elements 6 and 7 are switches, elements 9 and 10 are is a waveform memories element 11 is a correlation circuit; element 12 is a decision circuit, and element 19 is a read timing control circuit. Generally, the GCR signal is sent out once in every one field. Therefore the required number of fields are equal to the number of synchronous additions. In the training processing, however, the sendout interval may be set freely. Furthermore, the processing does not require the synchronous addition and the field sequence processing, so that it is possible to process all of the ghost detection, calculation and tap coefficient correction in one field. Therefore, when the training signal is generated every H, the processing speed can be significantly raised. The input video signal is fed to the transversal filter 2 through the switch 6. The input and output of the transversal filter 2 are fed into the CPU 5 by way of the waveform memories 3 and 4. After the training processing at the CPU 5, the training signal is written into the waveform memory 9. The switch 6 is changed over to the b-c position, and the training signal is read out from the waveform memory 9, and is fed into the transversal filter 2. The read timing control circuit 19 changes over the reading interval of the training signal from the waveform memory 9 between the normal field interval and the horizontal line interval. The input and output of the transversal filter 2 are taken into the CPU 5 through the waveform memories 3 and 4, and the ghost is cancelled. After ghost cancellation, the switch 6 is changed over to the a-c position, and the switch 7 is changed to the d-f position, so that the ghost-free video signal is delivered.

Figure 10:
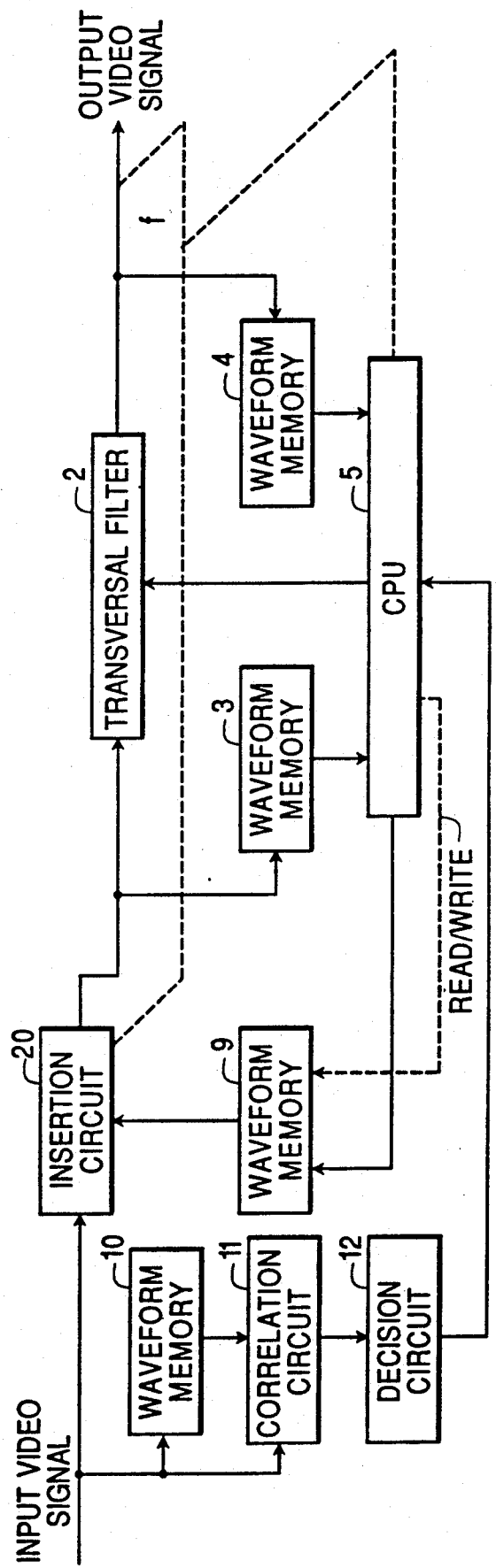

FIG. 10 is a specific circuit composition block diagram of a further different ghost canceller. In the foregoing circuit compositions, since the training signal is fed to the transversal filter 2 in the training processing period the input video signal must be delivered by changing over the switch 7. In this composition, by contrast, it is not necessary to change over the output video signal to the input video signal even during the training processing period. Element 2 is a transversal filter; elements 3 and 4 are waveform memories; element 5 is a CPU (central processing unit); elements 9 and 10 are is a waveform memories; element 11 is a correlation circuit, element 12 is a decision circuit, and element 20 is an insertion circuit. The input video signal is fed into the transversal filter 2 through the insertion circuit 20. The input and output of the transversal filter 2 are fed into the CPU 5 through the waveform memories 3 and 4. After the training processing in the CPU 5, the training signal is written into the waveform memory 9. The training signal read out of the waveform memory is inserted in the GCR signal position of the input video signal to replace the GCR signal in the insertion circuit 20. The training signals in the input and output video signals of the transversal filter 2 are taken into the CPU 5 through the waveform memories 3 and 4, thereby cancelling the ghosts. The transversal filter 2 is controlled, and the ghost-free video signal is delivered. The signals fed into the transversal filter 2 are not influenced at all with respect to the video signal portions, so that it is not necessary to change over the output of the ghost canceller.

What is claimed is:

1. A ghost canceller for cancelling ghosts by using a ghost cancel reference signal or a vertical synchronizing signal as a reference signal, comprising:
   a means for cancelling ghosts of an input video signal;
   a means for changing over an input of the ghost cancelling means between the input video signal of the ghost canceller and a training signal from a training signal generating means;
   an input waveform memory and output waveform memory for taking in the input signal and output signal of the ghost cancelling means; and
   an arithmetic means for performing synchronous addition of the reference signal, interfield processing according to sendout sequence and ghost cancelling operation so as to cancel the ghosts by taking in signals from the input waveform memory and output waveform memory;
   wherein the changing-over means cancels the ghosts by feeding the training signal into the ghost cancelling means, after transferring the signal subjected to the synchronous addition and interfield processing from the arithmetic means to the training signal generating means as the training signal.

2. A ghost canceller for cancelling ghosts by using a ghost cancel reference signal or a vertical synchronizing signal as a reference signal, comprising:
   a means for cancelling ghosts of an input video signal;
   a means for changing over an input of the ghost cancelling means between the input video signal of the ghost canceller and a training signal from a training signal generating means;
   a mean for detecting a variation of ghosts of the input video signal;
   an input waveform memory and output waveform memory for taking in the input signal and output signal of the ghost cancelling means; and
   an arithmetic means for performing synchronous addition of the reference signal, interfield processing according to a sendout sequence, and ghost cancelling operation so as to cancel the ghosts by taking in signals from the input waveform memory and output waveform memory;
   wherein the changing-over means feeds the training signal into the ghost cancelling means, after transferring the signal subjected to the synchronous addition and interfield processing from the arithmetic means to the training signal generating means as the training signal, and changes over to feed the input video signal into the ghost cancelling means only when it is judged that the ghost is not varied by the ghost variation detecting means, and to start the processing from the beginning when it is judged that the ghosts have varied.

3. A ghost canceller of claim 1 or 2, wherein the ghost cancelling means comprises a transversal filter.

4. A ghost canceller of claim 1 or 2, wherein the training signal generating means comprises a waveform memory which is controlled to store the training signal from the arithmetic means and output the stored training signal repeatedly.

5. A ghost canceller of claim 1 or 2, wherein the training signal generating means comprises an adder, a line memory and a switch, wherein the adder adds up the reference signal of the present field and the reference signal of one field before which has been read out by the line memory, the input of the adder is changed over to the output of the line memory by the switch so as to perform the synchronous addition, and after transferring the training signal from the arithmetic means to the line memory, the input of the adder is changed over to the ground, then the training signal read out from the line memory is fed into the ghost cancelling means.

6. A ghost canceller of claim 1 or 2, wherein the input waveform memory for taking in the input signal of the transversal filter is used for generating the training signal.

7. A ghost canceller of claim 1 or 2, further comprising read timing control means for determining whether the training signal from the training signal generating means is delivered in every field or every horizontal period, or is read out at an arbitrary timing by controlling by the arithmetic means.

8. A ghost canceller of claim 1 or 2, further comprising an insertion means provided before the ghost cancelling means for inserting the training signal into the ghost cancel reference signal superposing period of the input video signal

* * * * *